United States Patent [19]

Roentgen et al.

[11] Patent Number: 5,282,301
[45] Date of Patent: Feb. 1, 1994

[54] DEVICE FOR LAYING A RESISTANCE WIRE IN AN UNDULATING SHAPE ON THE INTERPOSED THERMOPLASTIC FILM OF A LAMINATED GLAZING

[75] Inventors: Paul Roentgen, Roetgen/Rott; Herbert Brammertz; Walter Schwarz, both of Aachen, all of Fed. Rep. of Germany

[73] Assignee: Saint-Gobain Vitrage International, Courbevoie, France

[21] Appl. No.: 824,950

[22] Filed: Jan. 24, 1992

[30] Foreign Application Priority Data

Jan. 24, 1991 [DE] Fed. Rep. of Germany ....... 4101984

[51] Int. Cl.[5] .................... B32B 5/08; B21F 1/04
[52] U.S. Cl. ....................... 29/33 F; 29/611; 156/436
[58] Field of Search ............ 29/429, 469.5, 33 F, 29/611; 156/436

[56] References Cited

U.S. PATENT DOCUMENTS

| | | | |
|---|---|---|---|
| 3,778,898 | 12/1973 | Gruss et al. | 29/611 |
| 3,954,547 | 5/1976 | Genthner | 29/611 X |
| 4,072,921 | 2/1978 | Sacchetti | 156/436 X |

Primary Examiner—Joseph M. Gorski
Attorney, Agent, or Firm—Oblon, Spivak, McClelland, Maier & Neustadt

[57] ABSTRACT

A device for laying and attaching a resistance wire (2) to a thermoplastic support film (1) for the production of a laminated glazing that can be heated electrically. The device includes a support (26, 27) for a wire bobbin (28), a wire guide device and a heated pressure roller (10) embedding resistance wire (2) in the support film. Between support (26, 27) for wire bobbin (28) and heated pressure roller (10), two gears (21, 22) are provided which mutually mesh, grasp wire (2) between them and deform the wire in an undulating manner. At least one of gears (21, 22) is driven by pressure roller (10) rolling over support film (1).

8 Claims, 2 Drawing Sheets

5,282,301

DEVICE FOR LAYING A RESISTANCE WIRE IN AN UNDULATING SHAPE ON THE INTERPOSED THERMOPLASTIC FILM OF A LAMINATED GLAZING

BACKGROUND OF THE INVENTION

1. Field of the Invention

This invention relates to a device for laying and attaching a resistance wire to a thermoplastic support film for the production of a laminated glazing that can be heated electrically, including a heated pressure roller which rolls over the support film to bond the resistance wire to the film, a support for a wire bobbin, and a wire guide device.

2. Discussion of the Background

In the case of a known device of this type which is used for laying antenna wire on the interposed plastic layer of a windshield of laminated glass, the wire is applied in a straight line on the support film (document DE-AS 20 43 706). This known device is not suitable for applying an electric resistance wire in an undulating shape on the support film.

In a known device for the application of a resistance wire in an undulating shape, the wire is brought above the support film by a laying device having the shape of a guide shoe driven with a periodic crosswise movement and the wire is at the same time embedded in the film (document DE-AS 16 79 930). The undulating shape of the wire is in this case produced directly on the surface of the film and the wire, at the moment it is laid, must be attached sufficiently to keep it from coming loose immediately under the effect of the tension created by the laying device. For this reason, the speed of laying the wire is subject to narrow limits.

In other devices known for laying a resistance wire in an undulating shape, ring gears placed obliquely relative to one another roll over the film, receive the wire between their teeth which draw near one another and deform the wire in an undulating manner immediately before it is laid on the support film, then embed it in the support film either themselves or with a pressure wheel provided with pressing pins meshing between the teeth (document DE-AS 22 04 939). These devices certainly make possible a high speed of laying, but they require frequent maintenance, because particles of the thermoplastic support film adhere easily to the teeth and to the pressing pins engaging in the surface of the support film and unfavorably affect the operating ability of the device.

SUMMARY OF THE INVENTION

Accordingly, one object of this invention is to provide a novel device for laying electric resistance wire in an undulating shape on the surface of the interposed thermoplastic layer of a laminated glazing, which makes possible, on the one hand, a high speed of laying and which is, on the other hand, simple and sturdy in design and not as susceptible to breakdowns as the prior art machines.

According to the invention, this object is achieved by the fact that between the support for the wire bobbin and the heated pressure roller, a pair of gears which mesh with one another and which deform the wire is installed, at least one of these gears being driven by the pressure roller rolling over the film.

In the case of the device according to the invention, the deformation of the wire is performed in a deformation device preceding the pressure roller and the pressure roller is used simply to embed the preshaped wire in the surface of the film. The width of the pressure roller is greater than the amplitude of the preshaped wire, so that, thanks to the wide pressure surface which, moreover, can have a smooth configuration, the pressure roller is not embedded in the film and so that this film is not damaged. The driving of the gears deforming the wire by the pressure roller assures that the wire is placed on the support film in a constant shape in a manner entirely independent of the speed of laying.

In an advantageous development of the invention, between the pressure roller and the pair of gears deforming the wire a gearing is used whose speed reducing ratio is selected so that the peripheral speed of the pressure roller and thus the speed of laying the preshaped wire is greater than the peripheral speed of the gears that deform the wire. In this way, the wire is held under a slight tension, over the distance between the pair of deforming gears and the laying point below the pressure roller, which makes it possible to avoid uncontrolled slippages of the wire.

By replacing the gears that determine the speed reducing ratio of the gearing by other gears determining another speed reducing ratio, it is possible in this simple manner to modify, within broad limits, the amplitude of the wire laid on the support film. The preshaped wire can actually be drawn more or less firmly, so that the amplitude of the preshaped wire is smaller the smaller the peripheral speed of the deforming gears relative to the peripheral speed of the pressure roller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
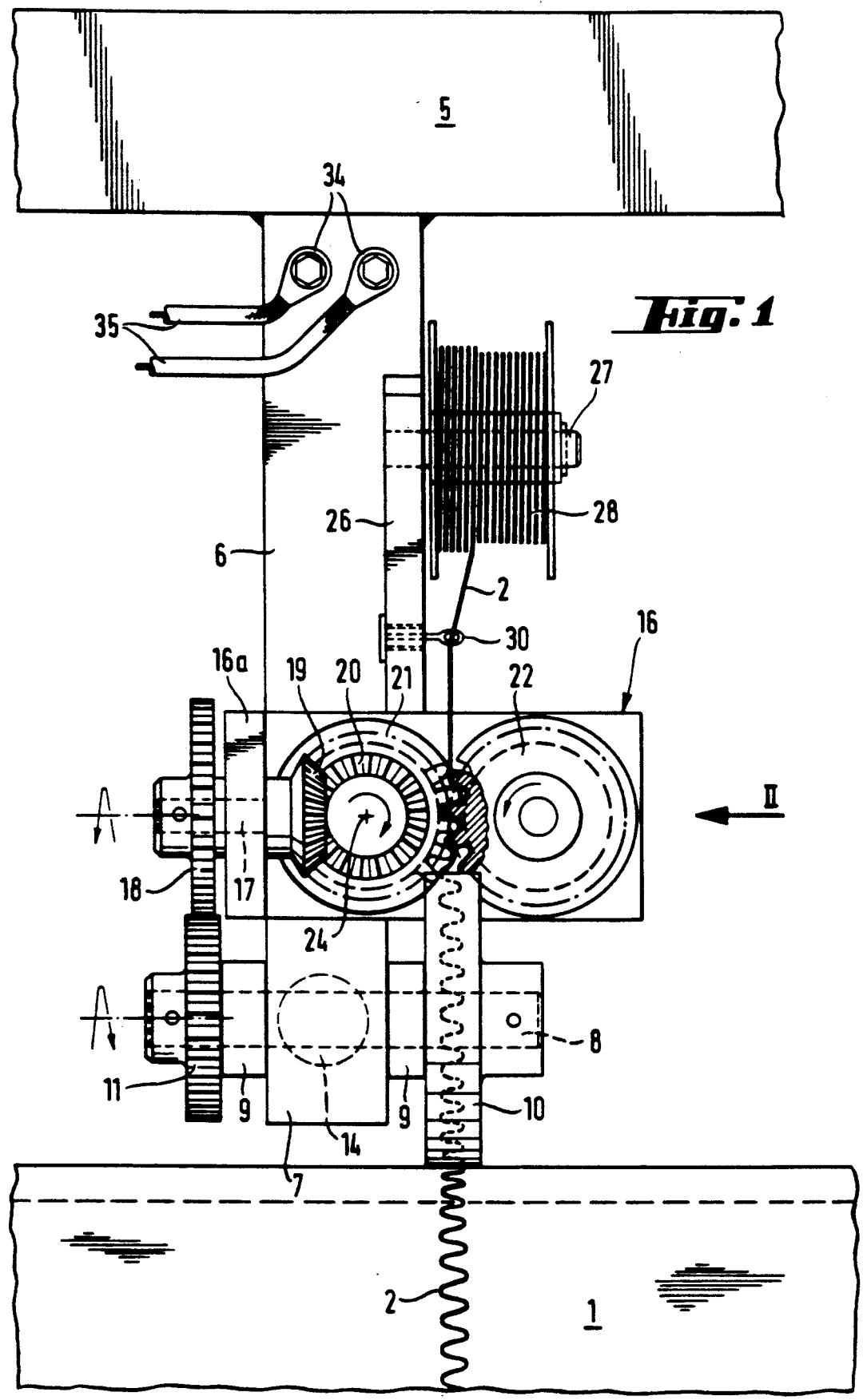
FIG. 1 is a front elevation view of a device for laying wire according to the invention.
Figure 2:
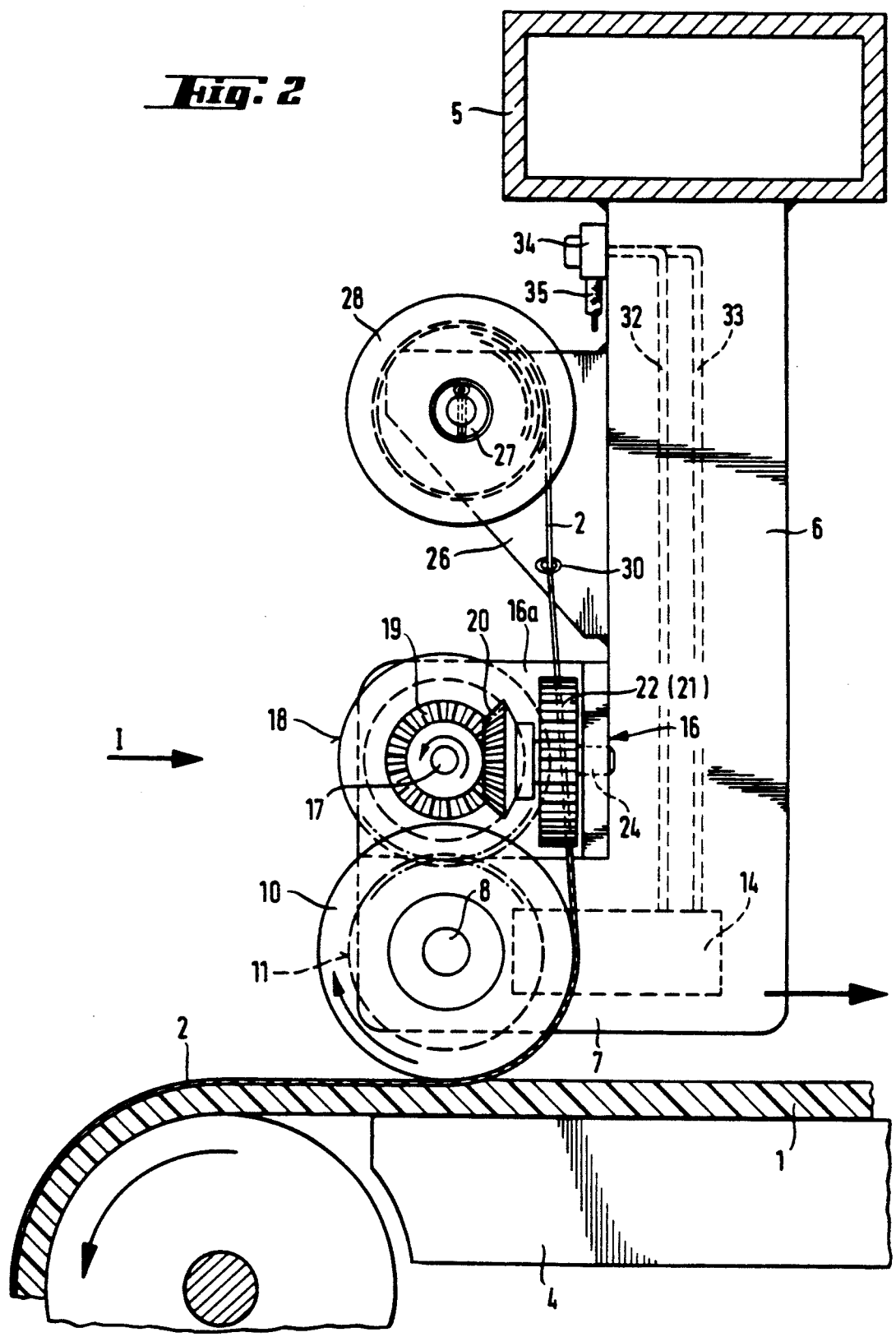
FIG. 2 is a side elevation view of the device for laying wire.

Referring now to the drawings, wherein like reference numerals designate identical or corresponding parts throughout the several views, and more particularly to FIG. 1 thereof, thermoplastic support film 1, on which resistance wire 2 is laid in an undulating shape, is usually of polyvinyl butyryl. For the laying of the resistance wire, the laying device is guided under a slight pressure over support film 1 which is immobilized on a work table, or support film 1 is advanced by a mobile support below the laying device while the laying device is kept stationary. Accordingly, it is necessary to make sure the laying device exerts a corresponding pressure on the film. Apparatuses which assure the positioning of the film and the laying device as well as the relative displacement necessary between the laying device and the support film are known in the art, so that the present description can be limited to the design of the laying device.

On crosspiece 5, which is installed above support table 4 for support film 1, one or more devices for laying wire are mounted. Each device for laying wire comprises a support arm 6 which is attached to crosspiece 5 and which, at its lower end, carries a swiveling part 7 in which shaft 8 is rotatably mounted. On this shaft 8, on one side of swiveling part 7, after inserting a spacer 9, pressure roller 10 is locked, while on the other side of swiveling part 7, also after inserting a spacer 9, a spur gear 11 is locked which consequently rotates jointly with pressure roller 10. Pressure roller 10 exhibits a smooth cylindrical surface and its width is greater than the amplitude of undulating wire 2. In swiveling part 7 an electrically heated resistor 14 is installed by which pressure roller 10 is heated to such an extent that at the location of contact of pressure roller 10 with support film 1, the thermoplastic material of the film is heated to the point that wire 2 laid in an undulating shape adheres to the softened surface of the film.

Rectangular-shaped swiveling part 16 is mounted above pressure roller 10 and spur gear 11, on support arm 6. Projecting flange 16a forms the bearing for shaft 17 parallel to shaft 8, to which is attached, above spur gear 11, a spur gear 18 which meshes with gear 11. On the other side of flange 16a, a bevel gear 19 is mounted on shaft 17. This bevel gear 19 is in mesh with a bevel gear 20 which is connected rigidly to a spur gear 21. Axis of rotation 24 for bevel gear 20 and for spur gear 21 is perpendicular to axis of rotation 17 and is mounted for rotation on swiveling part 16. Spur gear 21 meshes with a spur gear 22 placed beside it and forms with the latter the pair of gears being used to deform the wire. The segments of these two gears 21, 22, which are in mesh with one another, are in the zone located above pressure roller 10, so that wire 2 is deformed in an undulating manner in a nip where the gears mutually mesh, and after exiting the meshing zone, the deformed wire 2 is applied to the cylindrical surface of pressure roller 10.

Spur gears 11, 18 are dimensioned so that the peripheral speed of gears 21, 22 amounts to about 80% of the peripheral speed of pressure roller 10. By replacing gears 11 and 18 by gears of different diameters, it is possible to modify the speed reducing ratio so that, for example, the amplitude of wire 2 laid in an undulating shape can be modified.

Above swiveling part 16, on support arm 6, is mounted a bracket 26 which carries a support shaft 27 for wire bobbin 28. Bracket 26 further carries a wire guide ring 30 for wire 2 that is unwound from the bobbin.

Electrically heated resistor 14 is supplied with electric current by power supply conductors 32, 33 which extend inside support arm 6. Power supply conductors 32, 33 end at connecting terminals 34 to which are connected cables 35 coming from the power supply device.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for laying and attaching a resistance wire having an undulating shape to a thermoplastic support film for the production of a laminated glazing that can be heated electrically, comprising:
    a heated pressure roller mounted so as to roll over the support film to embed the resistance wire in the film;
    a support for a wire bobbin;
    a wire guide device; and
    a pair of wire-deforming gears mounted between said wire bobbin support and said heated pressure roller, said pair of wire-deforming gears engaging one another to deform wire fed therebetween, wherein at least one of said wire-deforming gears is driven by said heated pressure roller with a predetermined speed ratio such that a peripheral speed of said wire-deforming gears is less than a peripheral speed of said pressure roller.

2. The device according to claim 1, wherein said predetermined speed ratio is produced by a plurality of rotation transmitting gears between said heated pressure roller and said pair of wire-deforming gears, said rotation transmitting gears having a speed reducing ratio selected so that the peripheral speed of said wire-deforming gears is less than the peripheral speed of said heated pressure roller.

3. The device according to claim 2, wherein the peripheral speed of said wire-deforming gears is about 70 to 90% of the peripheral speed of said heated pressure roller.

4. The device according to claim 2, wherein said heated pressure roller is fixed on a shaft, and wherein said rotation transmitting gears include a first spur gear mounted on said shaft, a second spur gear meshing with said first spur gear, a first bevel gear connected to said second spur gear, and a second bevel gear connected to one of said wire-deforming gears.

5. The device according to claim 4, wherein said first spur gear and said second spur gear are replaceable by other pairs of gears to select another speed reducing ratio.

6. The device according to claim 1, wherein said wire-deforming gears are spur gears which mutually mesh, said spur gears having a plane of rotation extending perpendicularly to a plane of rotation of said heated pressure roller.

7. The device according to claim 1, wherein said wire guide device includes a wire guide ring, wherein said support for a wire bobbin includes a bobbin retaining shaft, and wherein said wire guide ring is provided between said bobbin retaining shaft and a nip at which said wire-deforming gears mutually mesh.

8. The device according to claim 1, wherein said heated pressure roller is rotatably mounted on a swiveling support part, and wherein an electric heating device is provided inside said swiveling support part.

* * * * *